May 12, 1925.  1,537,266
D. P. RYAN
WEEDLESS BAIT
Filed Sept. 5, 1924
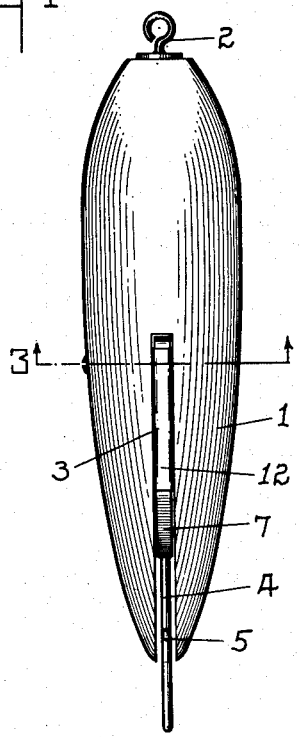
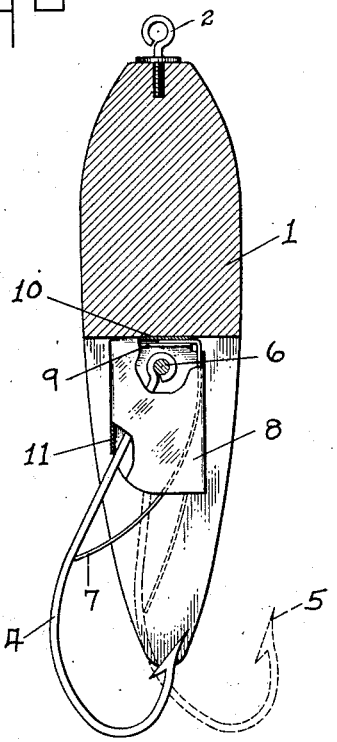
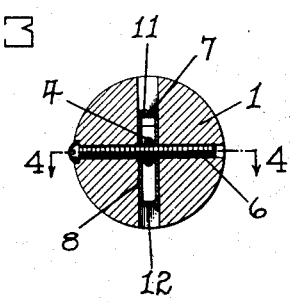
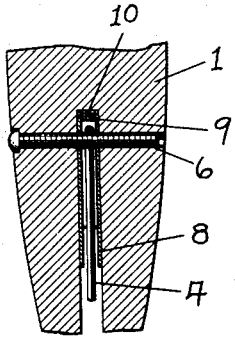
Inventor
Dennis P. Ryan
By Owen, Owen & Crampton
Attorney Patented May 12, 1925.

1,537,266

UNITED STATES PATENT OFFICE.

DENNIS P. RYAN, OF TOLEDO, OHIO.

WEEDLESS BAIT.

Application filed September 5, 1924. Serial No. 735,999.

*To all whom it may concern:*

Be it known that I, DENNIS P. RYAN, a citizen of the United States, and a resident of Toledo, in the county of Lucas and State of Ohio, have invented a new and useful Weedless Bait, which invention is fully described in the following specification.

My invention has for its object to provide an exceedingly efficient fish bait that is so constructed that the end of the hook is completely covered, so as to prevent it from engaging weeds over which the bait may be drawn, and yet when a strike is made the hook will be uncovered and catch the fish. The invention may be contained in artificial bait of different forms and to illustrate and describe a practical application of the invention, I have selected a preferred form of fish bait containing my invention. The fish bait selected as an example is shown in the accompanying drawings.

Figure 1 of the drawings is a side view of the artificial fish bait referred to. Figure 2 is a longitudinal sectional view. Figure 3 is a view of a transverse section taken on the line 3—3 indicated in Fig. 1, and Figure 4 is a view of a longitudinal section taken through the parts of the fish bait along the plane of the line 4—4 indicated in Fig. 3.

The fish bait may be provided with a body 1 of any suitable shape, such as the torpedo shape shown in Figs. 1 and 2. It is colored or decorated in any suitable manner such as to attract the eyes of fish and cause them to strike at the bait. It is provided with a suitable eye screw or pin 2 whereby the fish line may be connected to the artificial bait. The bait has a substantially enclosed region that is surrounded by portions of the bait, and the end or point of the hook is located in the recess whereby the point is shielded from engagement with weeds over which the bait may be drawn. The size of the enclosed region or recess may be merely sufficient to cover the point of the hook. In the particular form of construction shown, the body 1 of the bait is provided with a slot 3 that extends from one end towards the center of the bait in which the hook 4 may be located. The end 5 of the hook is preferably located at the end of the torpedo shaped body and so that its point will be enclosed within the pointed end of the torpedo body.

The hook is so supported or connected to the bait that it may be moved by the fish to place the hook in position such that the fish will be caught. In the form shown, it is pivotally supported so as to expose the sharper curved portion of the hook at a point on the bait that the fish will ordinarily strike, and thus cause the hook to be deflected so as to move the point from within the substantially covered region in which it is normally located. The hook is pivotally supported on a screw 6 that passes through the eye of the hook, the hook being located in the slot 3. The point 5 may then be located within the pointed end at the stern or rear of the bait.

In order to resiliently and normally retain the point of the hook in its covered position, it is lightly spring-pressed by means of the light spring 7. Preferably the connected ends of the hook and of the spring are located in a shell 8. The shell 8 is substantially closed except for the lower end, through which the hook and the spring extend. The shell is secured in position by the screw 6 that also passes through the eye of the hook, the location of the shell relative to the screw 6 being such as to cause the upper end of the shell to abut against the upper end surface that defines the slot 3. Thus rotation of the shell 8 is prevented and it maintains a fixed relation with respect to the bait. The upper end of the spring 7 is secured by two inwardly turned flanges 9 and 10 that extend across and form the closed end of the shell. This forms an anchor for the light spring 7. The spring 7 curves downward towards the hook 4 and extends along one of the narrower sides 11 of the shell and so that when the hook 4 is pressed towards the spring, the back of the spring will be pressed against the said narrower side and thus somewhat increase its resistance against the movement of the hook. The other narrower side 12 of the shell 8 limits the movement of the hook produced by the spring 7. The narrower side 11 will also limit the movement of the hook in the opposite direction that may be caused by some exterior object. Furthermore the shell provides a means for maintaining the spring 7 in its engaging relation with the hook 4 and prevents the hook 4 from slipping from the end of the spring 7.

I claim:—

1. An artificial bait for fish, having a recess, a fish hook pivotally connected to the body of the bait and having a curved portion in an exposed position relative to the body of the bait, a spring connected to the body of the bait for returning the hooked end into the recess when it is pressed therefrom by pressure on the curved exposed portion.

2. An artificial bait for fish, having a recess, the body of the bait having a slot extending inward from the end of the bait, a fish hook located in the slot and pivotally connected to the body of the bait and having a curved portion in an exposed position relative to the body of the bait, the hooked end of the hook being located in the slot at the end of the bait, a spring connected to the body of the bait for returning the hooked end into the recess when it is pressed therefrom by pressure on the curved exposed portion.

In testimony whereof I have hereunto signed my name to this specification.

DENNIS P. RYAN.